(12) United States Patent
Kako et al.

(10) Patent No.: US 12,155,060 B2
(45) Date of Patent: Nov. 26, 2024

(54) ENERGY STORAGE DEVICE

(71) Applicant: GS Yuasa International Ltd., Kyoto (JP)

(72) Inventors: Tomonori Kako, Kyoto (JP); Kazuki Kawaguchi, Kyoto (JP); Shota Ito, Kyoto (JP); Jun Oyama, Kyoto (JP); Taisei Sekiguchi, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 801 days.

(21) Appl. No.: 17/257,877

(22) PCT Filed: Jul. 18, 2019

(86) PCT No.: PCT/JP2019/028233
§ 371 (c)(1),
(2) Date: Jan. 5, 2021

(87) PCT Pub. No.: WO2020/017580
PCT Pub. Date: Jan. 23, 2020

(65) Prior Publication Data
US 2021/0273219 A1 Sep. 2, 2021

(30) Foreign Application Priority Data

Jul. 19, 2018 (JP) .................. 2018-135917

(51) Int. Cl.
*H01M 4/36* (2006.01)
*H01M 4/02* (2006.01)
(Continued)

(52) U.S. Cl.
CPC ........... *H01M 4/364* (2013.01); *H01M 4/133* (2013.01); *H01M 4/505* (2013.01); *H01M 4/525* (2013.01);
(Continued)

(58) Field of Classification Search
CPC ....... H01M 4/505; H01M 4/525; H01M 4/364
See application file for complete search history.

(56) References Cited

U.S. PATENT DOCUMENTS

| 2005/0170250 A1 | 8/2005 | Ohzuku et al. |
| 2006/0275664 A1 | 12/2006 | Ohzuku et al. |
| 2014/0205898 A1* | 7/2014 | Lee ..................... H01M 4/1391 427/126.6 |

(Continued)

FOREIGN PATENT DOCUMENTS

| JP | 2007-305549 A | 11/2007 |
| JP | 2007-317539 A | 12/2007 |

(Continued)

OTHER PUBLICATIONS

International Search Report (ISR) dated Oct. 8, 2019 filed in PCT/JP2019/028233.

*Primary Examiner* — Barbara L Gilliam
*Assistant Examiner* — Jordan E Berresford
(74) *Attorney, Agent, or Firm* — RANKIN, HILL & CLARK LLP

(57) ABSTRACT

One aspect of the present invention is an energy storage device including a positive electrode containing: first positive active material particles containing a metal element capable of forming a conductive metal oxide; and second positive active material particles not containing the metal element, in which the first positive active material particles include a nickel-cobalt-manganese-containing lithium-transition metal composite oxide containing lithium, nickel, cobalt, and manganese as constituent elements, and the first positive active material particles are larger in median diameter than the second positive active material particles.

4 Claims, 1 Drawing Sheet

(51) Int. Cl.
  *H01M 4/133* (2010.01)
  *H01M 4/505* (2010.01)
  *H01M 4/525* (2010.01)
  *H01M 4/62* (2006.01)
  *H01M 10/0525* (2010.01)
  *H01M 10/0562* (2010.01)

(52) U.S. Cl.
  CPC ....... *H01M 4/623* (2013.01); *H01M 10/0525* (2013.01); *H01M 10/0562* (2013.01); *H01M 2004/021* (2013.01); *H01M 2004/027* (2013.01); *H01M 2004/028* (2013.01); *H01M 2220/20* (2013.01); *H01M 2300/008* (2013.01)

(56) References Cited

U.S. PATENT DOCUMENTS

| | | | |
|---|---|---|---|
| 2015/0056511 A1 | 2/2015 | Takamatsu et al. | |
| 2019/0173085 A1 | 6/2019 | Sugimori et al. | |
| 2020/0388830 A1* | 12/2020 | Lee | H01M 4/505 |

FOREIGN PATENT DOCUMENTS

| | | | |
|---|---|---|---|
| JP | 2008-234872 A | 10/2008 | |
| JP | 2011-113783 A | 6/2011 | |
| JP | 2012-99271 A | 5/2012 | |
| JP | 2013-254639 A | 12/2013 | |
| JP | 2015-037012 A | 2/2015 | |
| JP | 2017-117766 A | 6/2017 | |
| WO | 2013/191179 A1 | 12/2013 | |
| WO | 2017/057078 A1 | 4/2017 | |
| WO | 2017/094237 A1 | 6/2017 | |

* cited by examiner

ENERGY STORAGE DEVICE

TECHNICAL FIELD

The present invention relates to an energy storage device.

BACKGROUND ART

Nonaqueous electrolyte secondary batteries typified by lithium ion secondary batteries have been frequently used for electronic devices such as personal computers and communication terminals, automobiles, and the like, because the batteries are high in energy density. The nonaqueous electrolyte secondary batteries each typically include an electrode assembly that has a pair of electrodes electrically isolated by a separator and a nonaqueous electrolyte interposed between the electrodes, and the batteries are configured to be charged and discharged by ion transfer between the both electrodes. In addition, capacitors such as lithium ion capacitors and electric double layer capacitors have been widely used as energy storage devices besides nonaqueous electrolyte secondary batteries.

In recent years, the energy storage devices have been improved in power performance in order to use the devices for a driving power source or the like as an assist in the case of starting and accelerating an electric vehicle (EV). In the prior art, in order to improve the discharge capacity per volume, a nonaqueous electrolyte secondary battery is proposed in which two or more positive active materials that differ in particle size are mixed to increase the volume density of the positive active materials (see Patent Document 1).

PRIOR ART DOCUMENT

Patent Document

Patent Document 1: JP-A-2011-113783

SUMMARY OF THE INVENTION

Problems to be Solved by the Invention

As for the above-mentioned energy storage device, however, the present inventor has found that in the case where two or more positive active materials that differ in particle size are used, the input/output performance is degraded after a charge-discharge cycle of repeating charge and discharge more than once (that is, the resistance after the cycle is increased). For the above-mentioned energy storage device, there is a demand for an energy storage device for high power applications, which has a greater effect of suppressing an increase in resistance.

The present invention has been made based on the foregoing circumstances, and an object of the invention is to provide an energy storage device that has a great effect of suppressing an increase in resistance in a charge-discharge cycle.

Means for Solving the Problems

One aspect of the present invention made to solve the problem mentioned above is an energy storage device including a positive electrode containing: first positive active material particles containing a metal element capable of forming a conductive metal oxide; and second positive active material particles not containing the metal element, in which the first positive active material particles include a nickel-cobalt-manganese-containing lithium-transition metal composite oxide containing lithium, nickel, cobalt, and manganese as constituent elements, and the first positive active material particles are larger in median diameter than the second positive active material particles.

Advantages of the Invention

According to the present invention, it is possible to provide an energy storage device that has a great effect of suppressing an increase in resistance in a charge-discharge cycle.

MODE FOR CARRYING OUT THE INVENTION

Figure 1:
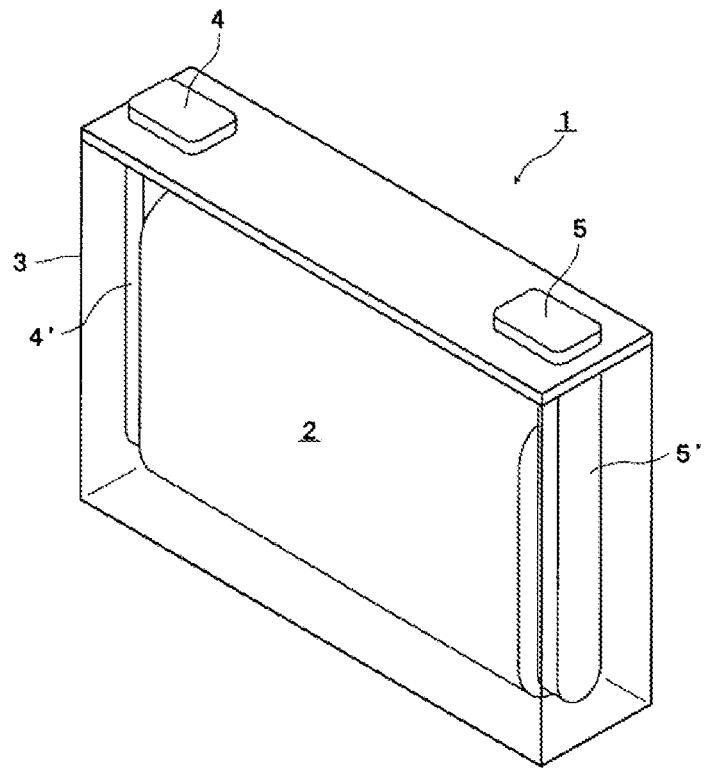
FIG. 1 is an external perspective view illustrating a nonaqueous electrolyte secondary battery according to an embodiment of the present invention.

One aspect of the present invention is an energy storage device including a positive electrode containing: first positive active material particles containing a metal element (hereinafter, also referred to as a "metal element M") capable of forming a conductive metal oxide; and second positive active material particles not containing the metal element M, in which the first positive active material particles include a nickel-cobalt-manganese-containing lithium-transition metal composite oxide containing lithium, nickel, cobalt, and manganese as constituent elements, and the first positive active material particles are larger in median diameter than the second positive active material particles. The first positive active material particles that are larger in median diameter than the second positive active material particles contain the metal element M capable of forming a conductive metal oxide, thereby causing the energy storage device to have a great effect of suppressing an increase in resistance in a charge-discharge cycle while increasing the capacity of the energy storage device. The reason why such an effect is produced is presumed as follows, for example.

More specifically, according to the findings of the present inventor, in the case where two or more positive active materials that differ in particle size are used for the positive electrode of the energy storage device, the degree of being filled with the positive active material is improved, thereby allowing the capacity of the energy storage device to be increased. In the case where two or more positive active materials that differ in particle size are used, due to the difference in resistance between particles that are larger in particle size and particles that are smaller in particle size, the current distribution is disturbed during charge-discharge, and accordingly, a difference is also produced in reaction distribution between the larger particles and the smaller particles. Thus, in a charge-discharge cycle, deterioration progresses differently between the larger and smaller particles, and there is a possibility that the resistance may increase due to the particles significantly deteriorated. In contrast, in the positive electrode of the energy storage device, the first positive active material particles that are larger in median diameter than the second positive active material particles contain the metal element M capable of forming a conductive metal oxide, thereby reducing the resistance of the positive active material particles, and reducing the resistance difference from the second positive active material particles. As a result, the energy storage device has a current distribution less disturbed during charge-discharge, thereby reducing the difference in progression of deterioration between the first positive active material particles that are larger in median diameter and the second positive active material particles that are smaller in median diameter. Accordingly, the effect of suppressing an increase in resistance in a charge-discharge cycle is believed to be produced. The reason is, however, not to be considered limited to the above-mentioned reason.

The metal element M capable of forming the conductive metal oxide is preferably a metal element that belongs to the Group 5 to Group 13 elements of the periodic table. The metal element M is a metal element that belongs to the Group 5 to Group 13 elements of the periodic table, thereby making it possible to reduce the difference in resistance between the first positive active material particles and the second positive active material particles, and thus making it possible to more effectively enhance the effect of suppressing an increase in resistance in a charge-discharge cycle.

The ratio of the median diameter of the first positive active material particles to the second positive active material particles is preferably 3.30 or more and 7.00 or less. The ratio of the median diameter of the first positive active material particles to the median diameter of the second positive active material particles falls within the range mentioned above, thereby making it possible to further enhance the effect of suppressing an increase in resistance during a charge-discharge cycles.

The content ratio of the first positive active material particles to the second positive active material particles is preferably 2.3 or more and 9.0 or less in mass ratio. The content ratio of the first positive active material particles to the second positive active material particles falls within the above range, thereby making it possible to further improve the effect of suppressing an increase in resistance in a charge-discharge cycle.

The second positive active material particles preferably include a nickel-cobalt-manganese-containing lithium-transition metal composite oxide containing lithium, nickel, cobalt, and manganese as constituent elements. The first positive active material particles and the second positive active material particles both contain the nickel-cobalt-manganese-containing lithium-transition metal composite oxide, and thereby the above-described effect can be better achieved.

In the nickel-cobalt-manganese-containing lithium-transition metal composite oxide constituting the first positive active material particles, the mole ratio of nickel to the sum of the metal elements excluding lithium is preferably 0.30 or more, and the mole ratio of cobalt to the sum of the metal elements excluding lithium is preferably 0.40 or less. With the use of the first positive active material particles that has such a specific composition, the above-described effect can be better achieved.

<Energy Storage Device>

The energy storage device according to one embodiment of the present invention includes a positive electrode, a negative electrode, and a nonaqueous electrolyte. A nonaqueous electrolyte secondary battery (in particular, a lithium ion secondary battery) will be described below as an example of the energy storage device, but is not intended to limit the application target of the present invention.

The positive electrode and the negative electrode typically form an electrode assembly with the positive and negative electrodes alternated by stacking or winding with a separator interposed therebetween. The electrode assembly is housed in a case, and the case is filled with a nonaqueous electrolyte. In the nonaqueous electrolyte secondary battery, as the nonaqueous electrolyte, the nonaqueous electrolyte described in detail below is used. The nonaqueous electrolyte is interposed between the positive electrode and the negative electrode. In addition, as the case, a known metallic case or the like can be used, which is typically used as a case of a nonaqueous electrolyte secondary battery.

[Positive Electrode]

The positive electrode has a positive electrode substrate and a positive active material layer disposed on the positive electrode substrate directly or with an intermediate layer interposed therebetween.

The positive electrode substrate has conductivity. As the material of the substrate, a metal such as aluminum, titanium, tantalum, and stainless steel, or an alloy thereof is used. Among these materials, aluminum and aluminum alloys are preferable from the viewpoint of the balance among potential resistance, high conductivity, and cost. In addition, examples of the form of the positive electrode substrate include a foil and a vapor deposition film, and the foil is preferable in terms of cost. More specifically, the positive electrode substrate is preferably an aluminum foil. Further, examples of the aluminum or aluminum alloy can include A1085P and A3003P specified in JIS-H-4000 (2014).

The intermediate layer, which serves as a coating layer on the surface of the positive electrode substrate, contains conductive particles such as carbon particles, thereby reducing the contact resistance between the positive electrode substrate and the positive active material layer. The structure of the intermediate layer is not particularly limited, and can be formed from, for example, a composition containing a resin binder and conductive particles. It is to be noted that, having "conductivity" means that the volume resistivity measured in accordance with JIS-H-0505 (1975) is $10^7$ Ω·cm or less, and "non-conductivity" means that the volume resistivity is more than $10^7$ Ω·CM.

The positive active material layer is formed from a so-called positive composite containing a positive active material. The positive composite includes the first positive active material particles containing the metal element M capable of forming a conductive metal oxide, and the second positive active material particles not containing the metal element M. In addition, the first positive active material particles are larger in median diameter than the second positive active material particles.

(First Positive Active Material Particles)

The first positive active material particles contain the metal element M capable of forming a conductive metal oxide. The first positive active material particles are larger in median diameter than the second positive active material particles. The first positive active material particles that are larger in median diameter than the second positive active material particles contain the metal element M capable of forming a conductive metal oxide (have the metal element M added thereto), thereby reducing the resistance of the first positive active material particles, and reducing the resistance difference from the second positive active material particles. As a result, the energy storage device has a current distribution less disturbed during charge-discharge, thereby reducing the difference in progression of deterioration between the first positive active material particles that are larger in median diameter and the second positive active material particles that are smaller in median diameter. Accordingly, the effect of suppressing an increase in resistance in a charge-discharge cycle is believed to be great.

In this regard, in this specification, the "conductive metal oxide", which is a metal oxide with electrical conductivity, refers to a metal oxide that has a volume resistivity of $10^7$ Ωcm or less (for example, 0.10 Ωcm or more and $10^7$ Ωcm or less). The volume resistivity of the conductive metal oxide may be preferably 105 Ωcm or less, more preferably $10^2$ Ωcm or less, further preferably 10 Ωcm or less, and particularly preferably 1.0 Ωcm or less.

The metal element M is not particularly limited as long as the element is capable of forming the conductive metal oxide mentioned above. For example, among the Group 4 to Group 14 elements of the periodic table, the metal elements that belong to the fourth to sixth periods and are capable of forming the conductive metal oxide mentioned above can be employed as the metal element M. The metal elements that belong to Group 5 to Group 13 elements of the periodic table are preferable, the metal elements that belong to the fifth period or the sixth period are more preferable among the metal elements that belong to Group 5 to Group 13 elements, the metal elements that belong to the fifth period or the sixth period are further preferable among the metal elements that belong to Group 5 to Group 10 elements, and the metal elements that belong to the fifth period or the sixth period are particularly preferable among the metal elements that belong to Group 5 to Group 6 elements. These metal elements are suitable in that the elements can form a conductive metal oxide that is lower in resistance. Specific examples of the metal element M include tungsten (W), titanium (Ti), niobium (Nb), tantalum (Ta), vanadium (V), chromium (Cr), molybdenum (Mo), iron (Fe), copper (Cu), tin (Sn), gallium (Ga), indium (In), zinc (Zn), cadmium (Cd), lanthanum (La), cerium (Ce), samarium (Sm), neodymium (Nd), yttrium (Y), rhodium (Rh), palladium (Pb), and platinum (Pt). Among these elements, any of W, Nb, and Mo, or a combination thereof is preferable, and the use of W is particularly preferable. The metal element M may be one, or two or more selected from the element group mentioned above. According to a preferred embodiment, 70% or more (in atomic number equivalent) of M has one, or two or more selected from the group consisting of W, Nb, and Mo. For example, an aspect in which M substantially consists of only W can be preferably employed. The combined use of the first positive active material particles with the specific metal element M added thereto, which are larger in diameter, and the second positive active material particles with the no specific metal element M added thereto, which are smaller in diameter, can achieve a highly durable energy storage device with a suppressed increase in resistance after a cycle.

The first positive active material particles may have the form of primary particles or the form of secondary particles of multiple primary particles aggregated. In addition, the first positive active material particles in the form of primary particles and the first positive active material particles in the form of secondary particles may be mixed. The technique disclosed herein can be preferably implemented in an aspect in which the first positive active material particles are secondary particles.

In the first positive active material particles, the existence form of the metal element M is not particularly limited. The metal element M may be present on the surfaces of the first positive active material particles or dissolved in the positive active material constituting the first positive active material particles, or a combination thereof may be employed. In a preferred embodiment, the metal element M is present on the surfaces of the first positive active material particles in the form of an M-containing compound containing the metal element M. As described above, the presence of the metal element M on the surfaces of the first positive active material particles can more suitably produce the above-described performance improvement effect (for example, an effect of suppressing an increase in resistance after a cycle). The M-containing compound can be, for example, an M-containing oxide containing the metal element M and oxygen (O) as constituent elements. In a preferred aspect, a lithium-containing and M-containing composite oxide composed of the metal element M, lithium, and oxygen is included as the M-containing oxide. Such an M-containing oxide is preferably present (for example, attached) on the surfaces of the first positive active material particles disclosed herein. This allows the effect of reducing the resistance of the first positive active material particles due to the presence of the M-containing oxide to be better produced. Alternatively, the M-containing oxide may be dispersed in the form of primary particles or the like in the secondary particles composed of the first positive active material particles.

The content of the metal element M in the first positive active material particles is not particularly limited. For example, the content of the metal element M can be 0.050 mol % or more with respect to the total number of moles of all of the metal elements excluding lithium and the metal element M in the first positive active material particles. The above-mentioned content is preferably 0.10 mol % or more, more preferably 0.15 mol % or more, and further preferably 0.20 mol % or more. In some aspects, the content may be, for example, 0.30 mol % or more, or 0.40 mol % or more (for example, 0.50 mol % or more). On the other hand, the upper limit of the content can be, for example, 5.0 mol %. The content is preferably 3.0 mol % or less, and more preferably 1.0 mol % or less. In some aspects, the content may be, for example, 0.90 mol % or less, or 0.80 mol % or less (for example, 0.60 mol % or less). The technique disclosed herein can be preferably implemented in an aspect in which the content of the metal element M is 0.20 mol % or more and 1.0 mol % or less, for example. The content of the metal element M within the range mentioned above can further enhance the effect of suppressing the resistance increase of the energy storage device.

The method of incorporating the metal element M into the first positive active material particles is not particularly limited. For example, a method can be employed in which a precursor for the positive active material is obtained by a wet method, the obtained precursor is mixed with an appropriate metal element M source, and the mixture is heat-treated in a predetermined temperature range. In addition, examples of the method for incorporating the metal element M include a method of mixing the positive active material with a slurry (suspension) containing an appropriate metal element M source, and then drying and heat-treating the mixture; and a method of mixing an appropriate metal element M source and a positive active material with the use of a wet or dry powder mixer, and then heat treating the mixture in a predetermined temperature range.

The positive active material that constitutes a main component of the first positive active material particles is a nickel-cobalt-manganese-containing lithium-transition metal composite oxide (NCM) containing at least lithium (Li), nickel (Ni), cobalt (Co), and manganese (Mn) as constituent elements. Preferable is a lithium-transition metal composite oxide containing, among these transition metal elements, Ni as a main component, or Ni, Co, and Mn in approximately the same proportions. In this regard, the nickel-cobalt-manganese-containing lithium transition metal composite oxide containing Ni as a main component refers to a lithium-transition metal composite oxide in which Ni accounts for 50 mol % or more (for example, 65 mol % or more) of the total number of moles of the transition metal elements contained in the composite oxide. The mole ratio (Ni/Me ratio) of Ni to the total of the metal elements excluding Li (for example, Ni, Co, and Mn in the case of a lithium-transition metal composite oxide containing only Ni, Co, and Mn as constituent elements besides Li) can be, for example, 0.10. From the viewpoint of increasing the energy density, the Ni/Me ratio is preferably 0.20 or more, and more preferably 0.30 or more. The Ni/Me ratio may be, for example, 0.50 or more, or may be 0.70 or more. In addition, the upper limit of the Ni/Me ratio is not particularly limited as long as Ni/Me<1.0 is met, but is preferably 0.95 or less, and more preferably 0.90 or less. The Ni/Me ratio may be, for example, 0.70 or less, or may be 0.50 or less. The mole ratio (Co/Me ratio) of Co to the total of the metal elements excluding Li is preferably 0.80 or less, more preferably 0.60 or less, and further preferably 0.40 or less. The Co/Me ratio may be, for example, 0.30 or less, or may be 0.15 or less. In addition, the lower limit of the Co/Me ratio is not particularly limited as long as 0<Co/Me is met, but is preferably 0.050 or more, and more preferably 0.080 or more. The Co/Me ratio may be, for example, 0.15 or more, or may be 0.30 or more. The mole ratio (Mn/Me ratio) of Mn to the total of the metal elements excluding Li is preferably 0.80 or less, more preferably 0.60 or less, and further preferably 0.40 or less. The Mn/Me ratio may be, for example, 0.30 or less, or may be 0.15 or less. In addition, the lower limit of the Mn/Me ratio is not particularly limited as long as 0<Mn/Me is met, but is preferably 0.050 or more, and more preferably 0.080 or more. The Mn/Me ratio may be, for example, 0.15 or more, or may be 0.30 or more. The nickel-cobalt-manganese-containing lithium-transition metal composite oxide may have a layered $\alpha$-NaFeO$_2$-type (that is, an X-ray diffraction pattern that can belong to the space group R3-m) crystal structure.

As a preferable composition for the lithium-transition metal composite oxide constituting the main component of the first positive active material particles disclosed herein, a lithium-transition metal composite oxide represented by the following general formula (I) is exemplified.

$$Li_aM1_bM2_cO_2 \quad (I)$$

In the foregoing general formula (I), M1 is composed of Ni, Co and Mn. M2 is at least one element selected from the group consisting of Al, Mg, Zr, Ca, K, Na, Si, B, F, Bi, Er, and Lu. M2 may be Zr. a can be a real number that satisfies $0.80 \leq a \leq 1.3$. b can be a real number that satisfies $0.70 \leq b \leq 1.1$. c can be a real number that satisfies $0 \leq c \leq 0.050$. c may be substantially 0 (that is, an oxide containing no M2). It is to be noted that the chemical formula that represents the lithium-transition metal composite oxide mentioned above is considered to show the composition in the state before the first charge treatment (that is, the charge treatment performed first after assembling battery constituent elements such as a positive electrode, a negative electrode, and an electrolyte).

The median diameter of the first positive active material particles (hereinafter, referred to simply as "D50$_f$") has only to be larger than the median diameter of the second positive active material particles (hereinafter, referred to simply as "D50$_s$") (that is, D50$_f$>D50$_s$), and is not particularly limited. From the viewpoint of enhancing the filling property of the positive active material layer, D50$_f$ can be, for example, 6.0 μm or more, and is, for example, 7.0 μm or more, and for example, 8.0 μm or more. D50$_f$ is preferably 10 μm or more, more preferably 12 μm or more, and further preferably 14 μm or more. In contrast, from the viewpoint of power characteristics and the like, the first positive active material particles with the median diameter (D50$_f$) of 50 μm or less are preferable, the first positive active material particles with the median diameter of 30 μm or less are more preferable, and the particles with the diameter of 25 μm or less are further preferable. The upper limit of D50$_f$ is particularly preferably 21 μm. In some aspects, D50$_f$ may be 18 μm or less, or 16 μm or less. The median diameter (D50) of the first positive active material particles within the range mentioned above further enhances the effect of suppressing the resistance increase of the energy storage device.

It is to be noted that the "median diameter" means a value (D50) at which the volume-based cumulative distribution calculated in accordance with JIS-Z-8819-2 (2001) is 50%. Specifically, the median diameter can be a value measured by the following method. The measurement is performed with the use of a laser diffraction-type particle size distribution measurement apparatus ("SALD-2200" from Shimadzu Corporation) as a measurement apparatus, and Wing SALD-2200 as measurement control software. With a scattering-type measurement mode employed, a wet cell in which a dispersion of a measurement sample dispersed in a dispersion solvent is circulated is irradiated with laser light, and a scattered light distribution is obtained from the measurement sample. Then, the scattered light distribution is approximated with a lognormal distribution, and the particle size corresponding to a cumulative frequency of 50% is defined as the median diameter (D50). Further, it has been confirmed from the SEM image that the median diameter based on the measurement mentioned above substantially agrees with the median diameter measured by extracting hundred particles while avoiding extremely large particles and extremely small particles. It is to be noted that the diameter of each particle in the measurement from this SEM image is regarded as the Feret diameter, and the volume of each particle is calculated as a sphere with the Feret diameter as the diameter.

The content W1 of the first positive active material particles in the positive composite is not particularly limited. The lower limit of the content W1 may be, for example, 40% by mass, or 50% by mass. From the viewpoint of enhancing the filling property of the positive active material layer, W1 is preferably 60% by mass or more, preferably 70% by mass or more, and more preferably 75% by mass or more. In some aspects, W1 may be, for example, 78% by mass or more, or 80% by mass or more. On the other hand, the upper limit of the content W1 is, for example, 95% by mass. From the viewpoint of power characteristics and the like, W1 is preferably 90% by mass or less, and more preferably 88% by mass or less. In some aspects, W1 may be, for example, 85% by mass or less, or 82% by mass or less. The energy storage device with the content of the first positive active material particles within the range mentioned above can further enhance the effect of suppressing an increase in resistance in a charge-discharge cycle for the energy storage device.

(Second Positive Active Material Particles)

The second positive active material particles are smaller in median diameter than the first positive active material particles, and contain no metal element M capable of forming the conductive metal oxide.

As the positive active material constituting the second positive active material particles, various materials conventionally used as a positive active material of a lithium ion secondary battery can be used without particular limitation. Examples of the materials include lithium-transition metal composite oxides represented by $Li_xM'O_y$ (M' represents at least one transition metal) ($Li_xCoO_2$, $Li_xNiO_2$, $Li_xMnO_3$, $Li_xNi\alpha Co_{(1-\alpha)}O_2$, $Li_xNi\alpha Mn\beta Co_{(1-\alpha-\beta)}O_2$ (NCM), $Li_xNi\alpha Co_\gamma Al_{(1-\alpha-\gamma)}O_2$ (NCA), and the like that have a layered $\alpha$-$NaFeO_2$-type crystal structure, $Li_xMn_2O_4$, $Li_xNi\alpha Mn_{(2-\alpha)}O_4$ and the like that have a spinel-type crystal structure), and polyanion compounds represented by $Li_wMe_x(XO_y)_z$ (Me represents at least one transition metal, and X represents, for example, P, Si, B, V, or the like) ($LiFePO_4$, $LiMnPO_4$, $LiNiPO_4$, $LiCoPO_4$, $Li_3V_2(PO_4)_3$, $Li_2MnSiO_4$, $Li_2CoPO_4F$, and the like). The elements or polyanions in these compounds may be partially substituted with other elements or anion species. For the second positive active material, one of these compounds may be used alone, or two or more thereof may be used in mixture.

In a preferred aspect, the positive active material constituting the second positive active material particles is composed of a lithium-transition metal composite oxide. Examples of the lithium-transition metal composite oxide include a nickel-containing lithium-transition metal composite oxide containing, besides lithium (Li), at least nickel (Ni) as a constituent element, a cobalt-containing lithium-transition metal composite oxide containing at least cobalt (Co) as a constituent element, and a manganese-containing lithium-transition metal composite oxide containing at least manganese (Mn) as a constituent element. The nickel-containing lithium-transition metal composite oxide may have a layered $\alpha$-$NaFeO_2$-type (that is, an X-ray diffraction pattern that can belong to the space group R3-m) crystal structure. The cobalt-containing lithium-transition metal composite oxide may have a layered $\alpha$-$NaFeO_2$-type crystal structure. The manganese-containing lithium-transition metal composite oxide may have a layered $\alpha$-$NaFeO_2$-type crystal structure or a spinel-type crystal structure.

For example, the positive active material constituting the second positive active material particles can contain the same metal element as the positive active material constituting the main component of the first positive active material particles. The positive active material constituting the second positive active material particles may be the same as or different from the positive active material constituting the main component of the first positive active material particles. In a preferable aspect, the positive active material constituting the second positive active material particles has the same composition as the positive active material constituting the main component of the first positive active material particles. The concept that "the positive active material has the same composition" herein can include an aspect in which the respective content ratios of the multiple metal elements contained in the positive active material vary within the range of ±10 mol % (preferably ±5 mol %, more preferably ±3 mol %, and further preferably ±1 mol %). As described above, the positive active material of the same composition is used for the first positive active material particles and the second positive active material particles, thereby making it possible to better suppress an increase in resistance after a cycle. In a preferred aspect, the second positive active material particles are composed of a layered nickel-cobalt-manganese-containing lithium-transition metal composite oxide (NCM) containing, besides lithium, nickel, cobalt, and manganese as constituent elements. Furthermore, in a preferable aspect, the second positive active material particles are composed of a lithium-transition metal composite oxide represented by the general formula (I).

Furthermore, in a preferable aspect, the second positive active material particles are composed of a lithium-transition metal composite oxide represented by the general formula (I), where M2 in the general formula (I) is Zr.

The second positive active material particles are not particularly limited as long as the median diameter ($D50_s$) thereof is smaller than $D50_f$ of the first positive active material particles ($D50_s<D50_f$). From the viewpoint of ease of production, handleability, and the like, particles with $D50_s$ of 0.10 μm or more can be preferably used as the second positive active material particles. For example, the second positive active material particles with $D50_s$ of 0.50 μm or more are preferable, and the second positive active material particles of 1.0 μm or more are more preferable. On the other hand, the median diameter ($D50_s$) can be, for example, less than 6.0 μm. $D50_s$ is preferably 5.5 μm or less, more preferably 5.0 μm or less, and further preferably 4.5 μm or less. For example, $D50_s$ may be 4.0 μm or less, or 3.5 μm or less. The median diameter ($D50_s$) of the second positive active material particles within the range mentioned above can further enhance the effect of suppressing the resistance increase of the energy storage device.

From the viewpoint of better producing the effect of using the first positive active material particles and the second positive active material particles in combination, the ratio ($D50_f/D50_s$) of the median diameter of the first positive active material particles to the second positive active material particles can be, for example, 1.50 or more and 10.0 or less. The first positive active material particles and the second positive active material particles are used in combination so as to have a specific median diameter ratio, thereby allowing the effect of suppressing an increase in resistance after a cycle to be achieved at a higher level while enhancing the filling property of the positive active material layer. The ratio ($D50_f/D50_s$) is preferably 3.30 or more, and more preferably 4.00 or more. On the other hand, the ratio ($D50_f/D50_s$) of the median diameter of the first positive active material particles to the second positive active material particles is preferably 9.00 or less, more preferably 7.00 or less, and further preferably 6.00 or less. The technique disclosed herein can be implemented in an aspect in which, for example, the relation between $D50_f$ and $D50_s$ meets $2.00 \leq (D50_f/D50_s) \leq 9.00$, more preferably $2.67 \leq (D50_f/D50_s) \leq 8.00$, further preferably $3.30 \leq (D50_f/D50_s) \leq 7.00$, and particularly preferably $4.00 \leq (D50_f/D50_s) \leq 6.00$. The energy storage device with the ratio of the median diameter of the first positive active material particles to the second positive active material particles within the range mentioned above can further enhance the effect of suppressing an increase in resistance in a charge-discharge cycle for the energy storage device.

$D50_f$ is preferably larger than $D50_s$ by 8.0 μm or more, and more preferably 10 μm or more (for example, 12 μm or more). In addition, the value obtained by subtracting $D50_s$ from $D50_f$ (that is, $D50_f-D50_s$) is preferably 30 μm or less, more preferably 25 μm or less, and further preferably 20 μm or less. For example, $D50_f-D50_s$ may be 15 μm or less.

The content W2 of the second positive active material particles in the positive composite is not particularly limited. The lower limit of the content W2 can be set to 5% by mass, for example. W2 is preferably 10% by mass or more, and more preferably 12% by mass or more. In some aspects, W2 may be, for example, 15% by mass or more, or 18% by mass or more. On the other hand, the upper limit of the content W2 is, for example, 60% by mass (for example, 50% by mass). W2 is preferably 40% by mass or less, and more preferably 30% by mass or less. In some aspects, W2 may be, for example, 25% by mass or less, or 22% by mass or less (for example, 20% by mass or less). The energy storage device with the content of the second positive active material particles within the range mentioned above can further enhance the effect of suppressing the resistance increase of the energy storage device.

The ratio of the content of the first positive active material particles to the second positive active material particles (W1/W2; mass basis) is not particularly limited. From the viewpoint of better producing the effect of using the first positive active material particles and the second positive active material particles in combination, the (W1/W2) ratio can be, for example, 0.60 or more, and is preferably 1.0 or more. In a preferable aspect, the content W1 of the first positive active material particles is higher than the content W2 of the second positive active material particles (that is, W1/W2>1.0). W1/W2 is more preferably 1.2 or more, further preferably 2.3 or more, and particularly preferably 3.0 or more. On the other hand, the upper limit of the ratio (W1/W2) of the content of the first positive active material particles to the second positive active material particles can be set to 20, for example. W1/W2 is preferably 19 or less, more preferably 15 or less, further preferably 9.0 or less, and particularly preferably 6.0 or less. The ratio of the content of the first positive active material particles to the second positive active material particles within the range mentioned above can improve the effect of suppressing an increase in resistance in a charge-discharge cycle while enhancing the filling property of the positive active materials. The technique disclosed herein can be preferably implemented in an aspect in which the ratio (W1/W2) of the content of the first positive active material particles to the second positive active material particles meets $1.0 \leq (W1/W2) \leq 19$ (further $2.3 \leq (W1/W2) \leq 9.0$, and particularly $3.0 \leq (W1/W2) \leq 6.0$).

This positive composite includes, in addition to the first positive active material particles and second positive active material particles described above, optional components such as a conductive agent, a binder (binder), a thickener, a filler, if necessary.

The conductive agent is not particularly limited as long as the agent is a conductive material that has no adverse effect on the performance of the energy storage device. Examples of such a conductive agent include natural or artificial graphite, carbon black such as furnace black, acetylene black, and ketjen black, metals, and conductive ceramics, and acetylene black is preferable. Examples of the conductive agent form include a powder form and fibrous form. In the case of using the conductive agent, the proportion of the conductive agent to the whole positive active material layer can be, for example, 1.0% by mass or more and 20% by mass or less, and is preferably 2% by mass or more and 15% by mass or less (for example, 3% by mass or more and 6% by mass or less).

Examples of the binder (binder) include thermoplastic resins such as fluororesins (polytetrafluoroethylene (PTFE), polyvinylidene fluoride (PVDF), and the like), polyethylene, polypropylene, and polyimide; elastomers such as an ethylene-propylene-diene rubber (EPDM), sulfonated EPDM, a styrene-butadiene rubber (SBR), and fluororubbers; and polysaccharide polymers. In the case of using the binder, the proportion of the binder to the whole positive active material layer can be, for example, 0.50% by mass or more and 15% by mass or less, and is preferably 1.0% by mass or more and 10% by mass or less (for example, 1.5% by mass or more and 3.0% by mass or less).

Examples of the thickener include polysaccharide polymers such as carboxymethyl cellulose (CMC) and methyl cellulose. In addition, in the case where the thickener has a functional group that reacts with lithium, this functional group is preferably deactivated in advance by methylation or the like. In the case of using the thickener, the proportion of the thickener to the whole positive active material layer can be, for example, 8.0% by mass or less, and is preferably 5.0% by mass or less (for example, 1.0% by mass or less). The technique disclosed herein can be preferably implemented in an aspect in which the positive active material layer contains no thickener mentioned above.

The filler is not particularly limited as long as the filler has no adverse effect on the battery performance. Examples of the main component of the filler include polyolefins such as polypropylene and polyethylene, silica, alumina, zeolite, and glass. In the case of using the filler, the proportion of the filler to the whole positive active material layer can be, for example, 8.0% by mass or less, and is preferably 5.0% by mass or less (for example, 1.0% by mass or less). The technique disclosed herein can be preferably implemented in an aspect in which the positive active material layer contains no filler mentioned above.

The upper limit of the porosity (voidage) of the positive active material layer is, for example, preferably 50%, and more preferably 35%. On the other hand, the lower limit of the porosity is, for example, preferably 20%, and more preferably 24%. The porosity of the positive active material layer within the range mentioned above makes it possible to produce favorable highly filled state and ionic diffusivity in a well-balanced manner.

The "porosity" of the positive active material layer refers to a value calculated by the following formula from the true density and filling density of the positive active material layer, calculated from the true densities of the respective components constituting the positive active material layer. The filling density refers to a value obtained by dividing the mass of the positive composite layer by the apparent volume of the positive active material layer. The apparent volume refers to a volume including voids, and can be obtained as a product of the thickness and the area in the case of the positive active material layer. It is to be noted that the same applies to the porosity of the negative active material layer described later.

Porosity (%)=100−(Filling Density/True Density)×100

The lower limit of the basis weight of the positive active material layer (the mass per unit area of the positive active material layer in the positive electrode) is preferably 0.50 g/100 cm$^2$, more preferably 1.0 g/100 cm$^2$, and further preferably 1.4 g/100 cm$^2$. On the other hand, the upper limit of the basis weight is preferably 10 g/100 cm$^2$, more preferably 5.0 g/100 cm$^2$, and further preferably 3.5 g/100 cm$^2$.

The lower limit of the density of the positive active material layer is preferably 0.50 g/cm$^3$, more preferably 1.0 g/cm$^3$, and further preferably 2.0 g/cm$^3$. On the other hand, the upper limit of this density is preferably 10 g/cm$^3$, more preferably 6.0 g/cm$^3$, and further preferably 4.0 g/cm$^3$.

[Nonaqueous Electrolyte]

As the nonaqueous electrolyte, known nonaqueous electrolytes can be used, which are typically used for common nonaqueous electrolyte energy storage devices. The nonaqueous electrolyte includes a nonaqueous solvent and an electrolyte salt dissolved in the nonaqueous solvent. In addition, the nonaqueous electrolyte may be solid.

As the nonaqueous solvent, known nonaqueous solvents can be used, which are typically used as nonaqueous solvents of nonaqueous electrolytes for common energy storage devices. Examples of the nonaqueous solvent include cyclic carbonates, chain carbonates, esters, ethers, amides, sulfones, lactones, and nitriles. Among these solvents, it is preferable to use at least the cyclic carbonate or the chain carbonate, and it is more preferable to use the cyclic carbonate and the chain carbonate in combination.

Examples of the cyclic carbonate include ethylene carbonate (EC), propylene carbonate (PC), butylene carbonate (BC), vinylene carbonate (VC), vinyl ethylene carbonate (VEC), chloroethylene carbonate, fluoroethylene carbonate (FEC), difluoroethylene carbonate (DFEC), styrene carbonate, catechol carbonate, 1-phenylvinylene carbonate, and 1,2-diphenylvinylene carbonate, and among these cyclic carbonates, EC is preferable.

Examples of the chain carbonate include diethyl carbonate (DEC), dimethyl carbonate (DMC), ethyl methyl carbonate (EMC), and diphenyl carbonate, and among these chain carbonates, EMC is preferable.

Examples of the electrolyte salt include lithium salts, sodium salts, potassium salts, magnesium salts, and onium salts, and the lithium salt are preferable. Examples of the lithium salt include inorganic lithium salts such as $LiPF_6$, $LiPO_2F_2$, $LiBF_4$, $LiPF_2(C_2O_4)_2$, $LiClO_4$, and $LiN(SO_2F)_2$, and lithium salts having a fluorinated hydrocarbon group, such as $USO_3CF_3$, $LiN(SO_2CF_3)_2$, $LiN(SO_2C_2F_5)_2$, $LiN(SO_2CF_3)(SO_2C_4F_9)$, $LiC(SO_2CF_3)_3$, and $LiC(SO_2C_2F_5)_3$.

Other additives may be added to the nonaqueous electrolyte. Further, as the nonaqueous electrolyte, ambient temperature molten salts, ionic liquids, polymer solid electrolytes, and the like can be used.

(Negative Electrode)

The negative electrode has a negative electrode substrate and a negative active material layer disposed on the negative electrode substrate directly or with an intermediate layer interposed therebetween. The intermediate layer may have the same structure as the intermediate layer of the positive electrode. In addition, a negative electrode overcoat layer including at least inorganic particles and a binder may be provided on the upper surface of the negative active material layer. Providing the negative electrode overcoat layer obtains effects such as improved ionic conductivity and a reduced possibility of short circuits.

While the negative electrode substrate may have the same configuration as the positive electrode substrate, a metal such as copper, nickel, stainless steel, nickel plated-steel, or an alloy thereof is used as the material of the negative electrode substrate, and copper or a copper alloy is preferable. More specifically, copper foil is preferable as the negative electrode substrate. Examples of the copper foil include rolled copper foil and electrolytic copper foil.

The negative active material layer is formed from a so-called negative composite containing a negative active material. In addition, the negative composite that forms the negative active material layer contains optional components such as a conductive agent, a binder (binder), a thickener, and a filler, if necessary. As the optional components such as a conductive agent, a binder, a thickener, and a filler, the same components as those for the positive active material layer can be used.

As the negative active material, a material capable of occluding and releasing lithium ions is typically used. Specific negative active materials include metals such as Si and Sn or semimetals; metal oxides such as Si oxides and Sn oxides or semimetal oxides; polyphosphoric acid compounds; carbon materials such as graphite (graphite), non-graphite carbon (graphitizable carbon or non-graphitizable carbon); and lithium metal composite oxides such as lithium titanate.

Furthermore, the negative composite may contain representative non-metal element such as B, N, P, F, Cl, Br, and I, representative metal elements such as Li, Na, Mg, Al, K, Ca, Zn, Ga, and Ge, and transition metal elements such as Sc, Ti, V, Cr, Mn, Fe, Co, Ni, Cu, Mo, Zr, Ta, Hf, Nb, and W.

The content of the negative active material in the negative active material layer is not particularly limited, but the lower limit thereof is preferably 50% by mass, more preferably 80% by mass, and further preferably 90% by mass. On the other hand, the upper limit of this content is preferably 99% by mass, and more preferably 98% by mass.

In the case of using the binder in the negative active material layer, the proportion of the binder to the whole negative active material layer can be, for example, 0.50% by mass or more and 15% by mass or less, and is preferably 1.0% by mass or more and 10% by mass or less (for example, 1.5% by mass or more and 3.0% by mass or less). In the case of using the thickener in the negative active material layer, the proportion of the thickener to the whole negative active material layer can be, for example, 0.10% by mass or more and 10% by mass or less, and is preferably 0.20% by mass or more and 5.0% by mass or less (for example, 0.30% by mass or more and 1.0% by mass or less). In the case of using the filler in the negative active material layer, the proportion of the filler to the whole negative active material layer can be, for example, 8.0% by mass or less, and is preferably 5.0% by mass or less (for example, 1.0% by mass or less). The technique disclosed herein can be preferably implemented in an aspect in which the negative active material layer contains no filler mentioned above. In the case of using the conductive agent in the negative active material layer, the proportion of the conductive agent to the whole negative active material layer can be, for example, 8.0% by mass or less, and is preferably 5.0% by mass or less (for example, 1.0% by mass or less). The technique disclosed herein can be preferably implemented in an aspect in which the negative active material layer contains no conductive agent mentioned above.

The upper limit of the porosity of the negative active material layer is preferably 45%, and more preferably 40%. On the other hand, the lower limit of the porosity is preferably 25%, and more preferably 30%. The porosity of the negative composite layer within the range mentioned above makes it possible to produce favorable highly filled state and ionic diffusivity in a well-balanced manner.

The lower limit of the basis weight of the negative composite (the mass per unit area of the negative active material layer in the negative electrode) is preferably 0.20 g/100 cm$^2$, more preferably 0.50 g/100 cm$^2$, further preferably 0.80 g/100 cm$^2$, and even more preferably 1.0 g/100 cm$^2$. On the other hand, the upper limit of the basis weight is preferably 8.0 g/100 cm$^2$, more preferably 5.0 g/100 cm$^2$, further preferably 3.0 g/100 cm$^2$, and even more preferably 2.0 g/100 cm$^2$.

The lower limit of the density of the negative active material layer is preferably 0.30 g/cm$^3$, more preferably 0.80 g/cm$^3$, and further preferably 1.0 g/cm$^3$. On the other hand, the upper limit of the density is preferably 5.0 g/cm$^3$, more preferably 3.0 g/cm$^3$, and further preferably 2.0 g/cm$^3$.

(Separator)

As the material of the separator, for example, a woven fabric, a non-woven fabric, a porous resin film, or the like is used. Among these materials, a porous resin film is preferable from the viewpoint of strength, and a non-woven fabric is preferable from the viewpoint of liquid retention for the nonaqueous electrolyte. The main component of the separator is preferably, for example, a polyolefin such as polyethylene or polypropylene from the viewpoint of strength, and is preferably, for example, a polyimide, an aramid, or the like from the viewpoint of resistance to oxidative decomposition. Furthermore, these resins may be combined. Furthermore, these resins may be combined. In addition, a composite separator including a porous resin film and an inorganic porous layer may be employed.

The nonaqueous electrolyte secondary battery (energy storage device) is capable of, because of the use of the nonaqueous electrolyte mentioned above, suppressing the swelling and resistance increase in a charge-discharge cycle.

<Method for Manufacturing Energy Storage Device>

The method for manufacturing the energy storage device includes, for example, a step of housing the positive electrode and the negative electrode (electrode assembly) in a case, and a step of injecting a nonaqueous electrolyte into the case. As the nonaqueous electrolyte, the above-described nonaqueous electrolyte is used.

The injection can be performed by a known method. After the injection, the injection port is sealed, thereby allowing a nonaqueous electrolyte secondary battery to be obtained. The details of each element constituting the nonaqueous electrolyte secondary battery obtained by the above-mentioned manufacturing method are as described above.

Other Embodiments

The present invention is not to be considered limited to the embodiment mentioned above, and can be implemented in various modified and improved aspects besides the aspects mentioned above. For example, there is no need to provide the intermediate layer in the positive electrode or negative electrode mentioned above. In addition, although an embodiment of the energy storage device that is a nonaqueous electrolyte secondary battery (in particular, a lithium ion secondary battery) has been mainly described in the embodiment mentioned above, other energy storage devices may be adopted. Other energy storage devices include capacitors (electric double layer capacitors, lithium ion capacitors).

FIG. 1 shows a schematic diagram of a rectangular nonaqueous electrolyte secondary battery 1 that is an embodiment of the energy storage device according to the present invention. It is to be noted that the figure is a diagram of the inside seen through a case. The nonaqueous electrolyte secondary battery 1 shown in FIG. 1 has an electrode assembly 2 housed in a battery case 3. The electrode assembly 2 is formed by winding a positive electrode including a positive active material and a negative electrode including a negative active material with a separator interposed therebetween. The positive electrode is electrically connected to a positive electrode terminal 4 through a positive electrode lead 4', and the negative electrode is electrically connected to a negative electrode terminal 5 through a negative electrode lead 5'. In addition, the nonaqueous electrolyte according to an embodiment of the present invention is injected into the battery case 3.

Figure 2:
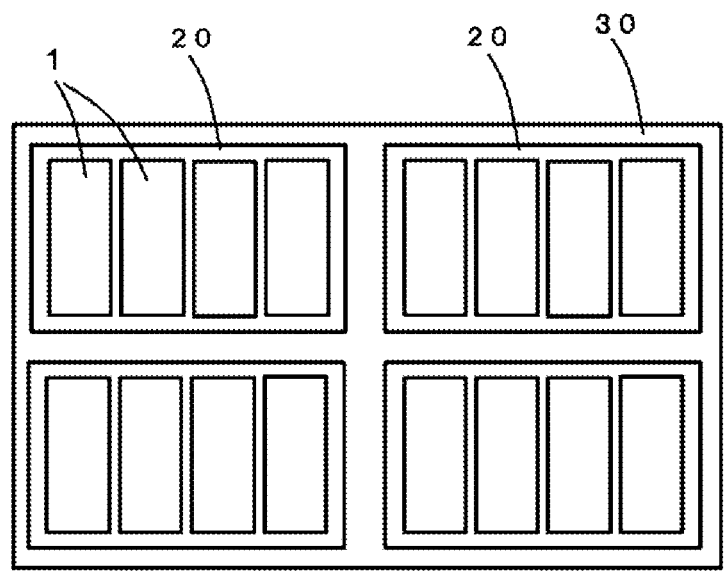
FIG. 2 is a schematic diagram illustrating an energy storage apparatus configured by assembling a plurality of nonaqueous electrolyte secondary batteries according to an embodiment of the present invention.

The configuration of the energy storage device according to the present invention is not to be considered particularly limited, and examples thereof include a cylindrical battery, a prismatic battery (rectangular battery), and a flattened battery. The present invention can be also achieved as an energy storage apparatus including the multiple energy storage devices mentioned above. One embodiment of the energy storage apparatus is shown in FIG. 2. In FIG. 2, the energy storage apparatus 30 includes a plurality of energy storage units 20. Each of the energy storage units 20 includes a plurality of nonaqueous electrolyte secondary batteries 1. The above-mentioned energy storage apparatus 30 can be mounted as a power source for vehicles such as electric vehicles (EV), hybrid vehicles (HEV), and plug-in hybrid vehicles (PHEV).

EXAMPLES

The present invention will be more specifically described below with reference to examples but the present invention is not to be considered limited to the following examples.

Example 1

(Preparation of Positive Electrode)

Used were first positive active material particles in which tungsten (W) as the metal element M was added to NCM ($LiNi_{0.6}Mn_{0.2}Co_{0.2}O_2$) having an $\alpha$-$NaFeO_2$-type crystal structure with a median diameter of 15 μm as a positive active material. The content (additive amount) of W in the first positive active material particles was an amount corresponding to 0.50 mol % with respect to the total number of moles of all metal elements (that is, Ni, Co, and Mn) excluding Li in the NCM.

NCM ($LiNi_{0.6}Mn_{0.2}Co_{0.2}O_2$) having an $\alpha$-$NaFeO_2$-type crystal structure with a median diameter of 3 μm was used as the second positive active material particles. In addition, the ratio of the content of the first positive active material particles is 4 to the second positive active material particles, and the ratio of the median diameter of the first positive active material particles is 5 to the second positive active material particles. It is to be noted that the median diameters of the first positive active material particles and second positive active material particles were determined in accordance with the above-mentioned method based on the laser diffraction-type particle size distribution measurement.

With the use of N-methylpyrrolidone (NMP) as a dispersion medium, the first positive active material particles, the second positive active material particles, acetylene black (AB) as a conductive agent, and polyvinylidene fluoride (PVdF) as a binder were mixed at ratios by mass of 75.2:18.8:4.0:2.0 in terms of solid content to obtain a positive composite paste. This positive composite paste was applied to each side of aluminum foil (0.015 mm in thickness) as a positive electrode substrate to reach 2.5 g/100 cm$^2$ in coating mass (basis weight in terms of solid content), and dried to prepare a positive active material layer. Thereafter, the layer was pressed until the electrode density reached 3.06 g/cm$^3$, thereby providing a positive electrode. The porosity of the positive active material layer of the obtained positive electrode was 30%.

(Preparation of Negative Electrode)

Graphite as a negative active material (AM), a styrene-butadiene rubber (SBR) as a binder, and carboxymethyl cellulose (CMC) as a thickener were used at ratios by mass of 97.9:1.5:0.6 to prepare a negative composite paste with water as a dispersion medium. This negative composite paste was applied to each side of copper foil (0.008 mm in thickness) as a negative electrode substrate to reach 1.5 g/100 cm$^2$ in coating mass (basis weight in terms of solid content), and dried to prepare a negative active material layer. Thereafter, the layer was pressed until the electrode density reached 1.42 g/cm$^3$, thereby providing a negative electrode. The porosity of the negative active material layer of the obtained negative electrode was 35%.
(Preparation of Nonaqueous Electrolyte)
Prepared was a nonaqueous electrolyte in which $LiPF_6$ was dissolved to reach 1.2 mol/L in a nonaqueous solvent of EC, EMC, and DMC mixed at volume ratios of 30:35:35.
(Production of Energy Storage Device)
As the separator, a polyethylene separator was used. The positive electrode and the negative electrode were stacked with the separator interposed therebetween, thereby preparing an electrode assembly. The electrode assembly was housed in a metallic case, the above-mentioned nonaqueous electrolyte was injected into the case, and the case was then sealed to obtain an energy storage device according to Example 1 as a test cell.

Example 2 to Example 12 and Comparative Example 1 to Comparative Example 3

Energy storage devices according to Examples 2 to Example 12 and Comparative example 1 to Comparative Example 3 were obtained similarly to Example 1 except that the compositions, median diameters, and tungsten contents of the first positive active material particles and second positive active material used, and the ratio of the content of the first positive active material particles to the second positive active material particles were employed as listed in Table 1 to Table 3.

It is to be noted that "—" in the tables below indicates that the corresponding component was not used.
[Evaluation]
(Measurement of Initial Discharge Capacity)
Each of the obtained energy storage devices was subjected to constant current constant voltage charge at 0.45 A under a temperature environment of 25° C. with a charge cutoff voltage of 3.91 V until the charge current reached 0.09 A or less. The device was stored in a constant-temperature bath at 45° C. for 3 days, then left at 25° C. for 1 hour or longer, subjected to constant current discharge at a current value of 3 A with an end-of-discharge voltage of 2.75 V, and after providing a pause for 10 minutes, subjected to constant current constant voltage charge at 0.45 A under a temperature environment of 25° C. with a charge cutoff voltage of 4.25 V until the charge current reached 0.09 A or less. After providing a pause for 10 minutes, constant current discharge was performed at a current value of 3 A. This discharge capacity was defined as an "initial discharge capacity".

(Charge-Discharge Cycle Test)
Each of the energy storage devices finished through the above-mentioned initial charge-discharge step was stored in a constant-temperature bath at 60° C. for 4 hours, and then subjected to constant current charge at 4.5 A up to a voltage at which the SOC (State of Charge) reached 100%, and then to constant voltage charge. The condition for ending the charge was set until the charge current time reached 0.01 C. Next, a pause for 10 minutes was provided after the charge. Thereafter, the device was subjected to constant current discharge at a discharge current of 9.0 A down to a voltage at which the SOC reached 0%, and then a pause for 10 minutes was provided. These charge and discharge steps were regarded as one cycle, and this cycle was repeated 1000 times. The charge, the discharge, and the pauses were all performed in a constant-temperature bath at 60° C.
(DCR Increase Rate after Charge-Discharge Cycle Test)
The DCR (DC resistance) of the energy storage device after the charge-discharge cycle test was evaluated. For each of the energy storage devices after the charge-discharge cycle test, each energy storage device after the initial discharge capacity measurement and after the 1000-cycle test was subjected to constant current charge at a current value of 1.8 A in a constant-temperature bath at 25° C., for the amount of charge corresponding to 50% SOC of the discharge capacity calculated under the same conditions as those for the above-mentioned method for calculating the discharge capacity. After adjusting the SOC of the battery to 50% under the above-mentioned conditions, each battery was discharged for 10 seconds at current values of 5, 10, 20, 40, and 70 A, and from the graph of current-voltage performance obtained by plotting the voltage 10 seconds after the start of the discharge on the vertical axis and the discharge current value on the horizontal axis, the DCR value corresponding to the slope was obtained. Then, the ratio of the "DCR after cycle test" to "the DCR before start of cycle test" ("DCR after cycle test"/"DCR before start of cycle test") at 25° C. was calculated to determine the "DCR increase rate (%)". The results are shown in Tables 1 to 3 below.

TABLE 1

| | First Positive Active Material Particle (Larger Diameter Particle) | | Second Positive Active Material Particle (Smaller Diameter Particle) | | NCM Ratio of Positive Active Material (Ni:Co:Mn) | Median Diameter Ratio First/Second | Ratio by Mass First/Second | Evaluation Resistance Increase Rate (%) |
|---|---|---|---|---|---|---|---|---|
| | Median Diameter | Tungsten Content (mol %) | Median Diameter | Tungsten Content (mol %) | | | | |
| Example 1 | 15 | 0.5 | 3 | — | 6:2:2 | 5.00 | 4 | 9.6 |
| Example 2 | 15 | 0.5 | 3 | — | 1:1:1 | 5.00 | 4 | 8.7 |
| Example 3 | 15 | 0.6 | 3 | — | 8:1:1 | 5.00 | 4 | 12.3 |
| Comparative Example 1 | 15 | 0.5 | 3 | 0.5 | 6:2:2 | 5.00 | 4 | 26.5 |
| Comparative Example 2 | 15 | — | 3 | 0.5 | 6:2:2 | 5.00 | 4 | 34.5 |
| Comparative Example 3 | 15 | — | 3 | — | 6:2:2 | 5.00 | 4 | 28.7 |

As shown in Table 1 above, Example 1 to Example 3 in which the first positive active material particles that are larger in median diameter than the second positive active material particles contains therein tungsten capable of forming a conductive metal oxide have resistance increase rates 25% or less after the cycles, and have great effects of suppressing the increases in resistance after the charge-discharge cycle test. Furthermore, the compositional ratio (Ni:Co:Mn) of the NCM according to Example 1 is 6:2:2, the compositional ratio of the NCM according to Example 2 is 1:1:1, and the compositional ratio of the NCM according to Example 3 is 8:1:1, while it is determined that Example 1 to Example 3 have great effects of suppressing the increases in resistance regardless of the compositional ratios of the NCMs.

In contrast, Comparative Example 2 and Comparative Example 3 in which the first positive active material particles that are large in median diameter contain therein no tungsten and Comparative Example 1 in which the first positive active material particles and the second positive active material particles contain therein tungsten have resistance increase rates in excess of 25% after the cycles, and have poor effects of suppressing the increases in resistance after the charge-discharge cycle test.

TABLE 2

| | First Positive Active Material Particle (Larger Diameter Particle) | | Second Positive Active Material Particle (Smaller Diameter Particle) | | NCM Ratio of Positive Active Material (Ni:Co:Mn) | Median Diameter Ratio First/Second | Ratio by Mass First/Second | Evaluation Resistance Increase Rate (%) |
|---|---|---|---|---|---|---|---|---|
| | Median Diameter | Tungsten Content (mol %) | Median Diameter | Tungsten Content (mol %) | | | | |
| Example 4 | 8 | 0.5 | 3 | — | 6:2:2 | 2.67 | 4 | 17.9 |
| Example 5 | 10 | 0.5 | 3 | — | 6:2:2 | 3.33 | 4 | 10.2 |
| Example 1 | 15 | 0.5 | 3 | — | 6:2:2 | 5.00 | 4 | 9.6 |
| Example 6 | 21 | 0.5 | 3 | — | 6:2:2 | 7.00 | 4 | 11.3 |
| Example 7 | 24 | 0.5 | 3 | — | 6:2:2 | 8.00 | 4 | 16.5 |

As shown in Table 2 above, Example 1, Example 5, and Example 6 in which the ratio of the median diameter of the first positive active material particles to the second positive active material particles is 3.30 or more and 7.00 or less have greater effects of suppressing the increases in resistance after the charge-discharge cycle test.

TABLE 3

| | First Positive Active Material Particle (Larger Diameter Particle) | | Second Positive Active Material Particle (Smaller Diameter Particle) | | NCM Ratio of Positive Active Material (Ni:Co:Mn) | Median Diameter Ratio First/Second | Ratio by Mass First/Second | Evaluation Resistance Increase Rate (%) |
|---|---|---|---|---|---|---|---|---|
| | Median Diameter | Tungsten Content (mol %) | Median Diameter | Tungsten Content (mol %) | | | | |
| Example 8 | 15 | 0.5 | 3 | — | 6:2:2 | 5.00 | 1 | 18.5 |
| Example 9 | 15 | 0.5 | 3 | — | 6:2:2 | 5.00 | 1.5 | 16.8 |
| Example 10 | 15 | 0.5 | 3 | — | 6:2:2 | 5.00 | 2.3 | 12.1 |
| Example 1 | 15 | 0.5 | 3 | — | 6:2:2 | 5.00 | 4 | 9.6 |
| Example 11 | 15 | 0.5 | 3 | — | 6:2:2 | 5.00 | 9 | 10.7 |
| Example 12 | 15 | 0.5 | 3 | — | 6:2:2 | 5.00 | 19 | 17.3 |

As shown in Table 3 above, Example 1, Example 10, and Example 11 in which the ratio of the content of the first positive active material particles to the second positive active material particles is 2.3 or more and 9.0 or less in ratio by mass have greater effects of suppressing the increases in resistance after the charge-discharge cycle test.

From the foregoing results, it has been determined that the energy storage device has a great effect of suppressing increases in resistance in the charge-discharge cycles.

INDUSTRIAL APPLICABILITY

The present invention can be applied to energy storage devices, including nonaqueous electrolyte secondary batteries, for use as power sources for electronic devices such as personal computers and communication terminals, automobiles, and the like.

Preferable application targets of the technique disclosed herein include a large-size lithium ion secondary battery. Exemplified is, for example, a large-capacity type lithium ion secondary battery that has a battery capacity of 5.0 Ah or more (further 10 Ah or more, particularly 20 Ah or more, and for example 30 Ah or more). The energy storage device according to the present invention has a great effect of suppressing an increase in resistance in a charge-discharge cycle while increasing the capacity of the energy storage device, and thus can be suitably applied to the above-described large-capacity type lithium ion secondary battery.

DESCRIPTION OF REFERENCE SIGNS

1: Nonaqueous electrolyte secondary battery
2: Electrode assembly
3: Battery case
4: Positive electrode terminal
4': Positive electrode lead
5: Negative electrode terminal
5': Negative electrode lead
20: Energy storage unit
30: Energy storage apparatus

The invention claimed is:

1. An energy storage device comprising a positive electrode containing:
   first positive active material particles containing a first nickel-cobalt-manganese-containing lithium-transition metal composite oxide containing lithium, nickel, cobalt and manganese as constituent elements, and a metal element capable of forming a conductive metal oxide; and
   second positive active material particles containing a second nickel-cobalt-manganese-containing lithium-transition metal composite oxide containing lithium, nickel, cobalt and manganese as constituent elements, and not containing the metal element capable of forming the conductive metal oxide,
   wherein
   the metal element capable of forming the conductive metal oxide includes tungsten and optionally one or more selected from a group consisting of vanadium, iron, copper, tin, gallium, indium, zinc, cadmium, lanthanum, cerium, samarium, neodymium, yttrium, rhodium, palladium and platinum,
   in the first nickel-cobalt-manganese-containing lithium-transition metal composite oxide, a mole ratio of nickel to a sum of metal elements excluding lithium is 0.30 or more and 0.95 or less, a mole ratio of cobalt to the sum of the metal elements excluding lithium is 0.050 or more and 0.80 or less, and a mole ratio of manganese to the sum of the metal elements excluding lithium is 0.050 or more and 0.80 or less,
   in the second nickel-cobalt-manganese-containing lithium-transition metal composite oxide, a mole ratio of nickel to a sum of metal elements excluding lithium is 0.30 or more and 0.95 or less, a mole ratio of cobalt to the sum of the metal elements excluding lithium is 0.050 or more and 0.80 or less, and a mole ratio of manganese to the sum of the metal elements excluding lithium is 0.050 or more and 0.80 or less,
   the first positive active material particles are larger in median diameter than the second positive active material particles, and
   a ratio of a median diameter of the first positive active material particles to a median diameter of the second positive active material particles is 3.30 or more and 7.00 or less.

2. The energy storage device according to claim 1, wherein a ratio of a median diameter of the first positive active material particles to the second positive active material particles is 3.33 or more and 7.00 or less.

3. An energy storage device comprising a positive electrode containing:
   first positive active material particles containing a first nickel-cobalt-manganese-containing lithium-transition metal composite oxide containing lithium, nickel, cobalt and manganese as constituent elements, and tungsten; and
   second positive active material particles containing a second nickel-cobalt-manganese-containing lithium-transition metal composite oxide containing lithium, nickel, cobalt and manganese as constituent elements, and not containing tungsten,
   wherein
   in the first nickel-cobalt-manganese-containing lithium-transition metal composite oxide, a mole ratio of nickel to a sum of metal elements excluding lithium is 0.30 or more and 0.95 or less, a mole ratio of cobalt to the sum of the metal elements excluding lithium is 0.050 or more and 0.80 or less, and a mole ratio of manganese to the sum of the metal elements excluding lithium is 0.050 or more and 0.80 or less,
   in the second nickel-cobalt-manganese-containing lithium-transition metal composite oxide, a mole ratio of nickel to a sum of metal elements excluding lithium is 0.30 or more and 0.95 or less, a mole ratio of cobalt to the sum of the metal elements excluding lithium is 0.050 or more and 0.80 or less, and a mole ratio of manganese to the sum of the metal elements excluding lithium is 0.050 or more and 0.80 or less,
   the first positive active material particles are larger in median diameter than the second positive active material particles,
   a ratio of a median diameter of the first positive active material particles to the second positive active material particles is 3.30 or more and 7.00 or less, and
   a ratio of a content of the first positive active material particles to the second positive active material particles is 2.3 or more and 9.0 or less in terms of mass ratio.

4. The energy storage device according to claim 3, wherein a ratio of a median diameter of the first positive active material particles to the second positive active material particles is 3.33 or more and 7.00 or less.

* * * * *